(12) United States Patent
Smith, Jr. et al.

(10) Patent No.: US 10,899,937 B2
(45) Date of Patent: Jan. 26, 2021

(54) HYDROGEN-BONDING SURFACES FOR ICE MITIGATION

(71) Applicant: U.S.A. as represented by the Administrator of the National Aeronautics and Space Administration, Washington, DC (US)

(72) Inventors: Joseph G. Smith, Jr., Smithfield, VA (US); Christopher J. Wohl, Jr., Portsmouth, VA (US)

(73) Assignee: U.S.A. as represented by the Administrator of the National Aeronautics and Space Administration, Washington, DC (US)

(*) Notice: Subject to any disclaimer, the term of this patent is extended or adjusted under 35 U.S.C. 154(b) by 221 days.

(21) Appl. No.: 14/976,700

(22) Filed: Dec. 21, 2015

(65) Prior Publication Data

US 2016/0177106 A1 Jun. 23, 2016

Related U.S. Application Data

(60) Provisional application No. 62/095,158, filed on Dec. 22, 2014, provisional application No. 62/160,275, filed on May 12, 2015.

(51) Int. Cl.
*B64D 15/00* (2006.01)
*C23C 18/12* (2006.01)
(Continued)

(52) U.S. Cl.
CPC .......... *C09D 5/1625* (2013.01); *B64D 15/00* (2013.01); *C09D 5/00* (2013.01); *C09D 183/04* (2013.01);
(Continued)

(58) Field of Classification Search
None
See application file for complete search history.

(56) References Cited

U.S. PATENT DOCUMENTS

| | | | |
|---|---|---|---|
| 5,113,005 A | 5/1992 | Celebuski | |
| 5,188,750 A * | 2/1993 | Kogure | C09D 143/04 106/13 |

(Continued)

FOREIGN PATENT DOCUMENTS

WO WO-2014136275 A1 * 9/2014 ........... C09D 183/04

OTHER PUBLICATIONS

T. Inada et al., "Thermal Hysteresis Caused by Non-Equilibrium Antifreeze Activity of Poly(Vinyl Alcohol)," Chem. Phys. Lett. 2004, 394, 361-365.

(Continued)

*Primary Examiner* — Kenneth J Stachel
(74) *Attorney, Agent, or Firm* — Jennifer L. Riley; Robin W. Edwards; Helen M. Galus

(57) ABSTRACT

Various embodiments provide ice mitigating surface coatings and methods for applying ice mitigating surface coatings. Various embodiment ice mitigating surface coatings may be formed by hydrolysis of one or more substituted n-alkyldimethylalkoxysilanes terminated with functionalities having the following characteristics with respect to water: 1) non-polar interactions; 2) hydrogen bonding through donor and acceptor interactions; or 3) hydrogen bonding through acceptor interactions only. The substituted n-alkyldimethylalkoxysilanes of the various embodiments may include methyl terminated species, hydroxyl terminated species, ethylene glycol terminated species, and methoxyethylene glycol terminated species. Various embodiment ice mitigating surface coatings may be applied to metal surfaces, such as aluminum surfaces. Various embodiment substituted n-alkyldimethylalkoxysilanes may have an ali- (Continued)

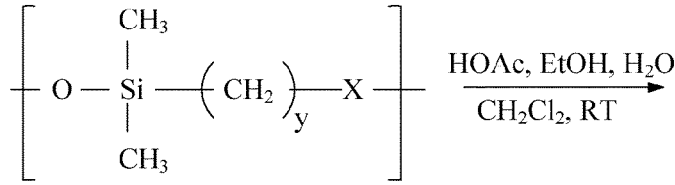 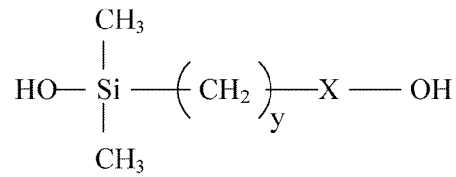

Hydrogen-bonding (donor/acceptor)
Hydroxyl
X = - (i.e., single bond)
y = 7-11
EG
X = -OCH$_2$CH$_2$-
y = 2 phatic chain that is saturated and liner or branched or that is partially unsaturated and liner or branched.

8 Claims, 15 Drawing Sheets

(51) Int. Cl.

| | |
|---|---|
| *C09D 5/16* | (2006.01) |
| *C09D 183/06* | (2006.01) |
| *C09D 183/04* | (2006.01) |
| *C09D 5/00* | (2006.01) |
| *C08G 77/18* | (2006.01) |
| *C09D 7/63* | (2018.01) |

(52) U.S. Cl.
CPC .......... *C09D 183/06* (2013.01); *C23C 18/125* (2013.01); *C08G 77/18* (2013.01); *C09D 7/63* (2018.01); *C23C 2222/20* (2013.01)

(56) References Cited

U.S. PATENT DOCUMENTS

| | | | | |
|---|---|---|---|---|
| 5,430,167 | A * | 7/1995 | Klein | B01F 17/0071 516/199 |
| 6,723,971 | B1 * | 4/2004 | Petrenko | B64D 15/12 174/110 R |
| 2006/0122351 | A1 * | 6/2006 | Laine | C08G 77/045 528/31 |
| 2006/0269724 | A1 * | 11/2006 | Ohashi | G02B 1/111 428/143 |
| 2010/0068486 | A1 * | 3/2010 | Kayanoki | B32B 17/10018 428/213 |
| 2012/0029090 | A1 * | 2/2012 | Brugger | C08G 65/22 514/772.7 |
| 2016/0032146 | A1 * | 2/2016 | Hozumi | C09D 183/04 528/39 |

OTHER PUBLICATIONS

T. Inada et al., "Growth Control of Ice Crystals by Poly(Vinyl Alcohol) and Antifreeze Protein in Ice Slurries." Chem Eng. Sci. 2006, 61, 3149-3158.
H Y. Wang et al., "Inhibition of Nucleation and Growth of Ice by Poly(Vinyl Alcohol) in Vitrification Solution." Cryobio. 2009, 59, 83-89.
S. Jung et al., "Are Superhydrophobic Surfaces Best for Icephobicity?" Langmuir 2011, 27, 3059-3066.
S. A. Kulinich et al., "Superhydrophobic Surfaces: Are They Really Ice-Repellent?" Langmuir, 27 (2011) 25-29.
T. Inada et al., "Ice Nucleation in Emulsified Aqueous Solutions of Antifreeze Protein Type III and Poly(Vinyl Alcohol)." J. Phys. Chem. B 2011, 115, 7914-7922.
Cok, David Conference paper, "OpenJML: Software verification for Java 7 using JML, OpenJDK, and Eclipse," EPTCS 149, 2014. pp. 79-92.
Paotapczuk, M. G., "Aircraft Icing Research at NASA Glenn Research Center" J. Aerosp. Eng. 2013, 26, 260-276.
S. Kulinich at al., "How Wetting Hysteresis Influences Ice Adhesion Strength on Superhydrophobic Surfaces." Langmuir 2009, 25-29, 8854-8856.
S. Anitei et al., Fish 'Antifreeze' Against Icy Aeroplanes. Aug. 8, 2007; available at http://news.softpedia.com/news/Fish-Antifreeze-Against-Icy-Aeroplanes-62189.shtml.
J. Soltis et. al., "Evaluation of Ice Adhesion Strength on Erosion Resistant Materials," 54th AIAA/ASME/ASCE/AHS/ASC Structures, Structural Dynamics, and Materials Conference, Apr. 8-11, 2013, Boston, MA, AIAA 2013-1509.
J. G. Smith et. al., "Hydrogen-Bonding Surfaces for Ice Mitigation" NASA TM 2014-218291, Jul. 2014.

E.P. Plueddemann, "Silane Coupling Agents", Plenum Press, New York, 1982.
R.H. Terrill et. al., "Monolayers in Three Dimensions: NMR, SAXS, Thermal, and Electron Hopping Studies of Alkanethiol Stabilized Gold Cluster," J. Am Chem. Soc., 117 (1995) 12537-12548.
F. Tao et. al., "Understanding Odd-Even Effects in Organic Self-Assembled Monlayers," Chem. Rev., 107 (2007) 1408-1453.
V.F. Petrenko et. al., "Reduction of Ice Adhesion to Metal using Self-Assembling Monolayers", Can. J. Phys., 81 (2003) pp. 387-393.
F. T. Lynch et al., "A. Effects of Ice Accretions on Aircraft Aerodynamics." Progress in Aerospace Sciences, 37 (2001), pp. 669-767.
P. Demott et al., "Freezing Nucleation Rates of Dilute Solution Droplets Measured between −30° and −40° C. in Laboratory Simulations of Natural Clouds," Journal of the Atmospheric Sciences, vol. 47, No. 9, pp. 1056-1064.
M.K. Politovich, "Aircraft Icing in Encyclopedia of Atmospheric Sciences." Academic Press. Oxford, U.K., 2003.
H. E. Addy, Jr. et al., "Modern Airfoil Ice Accreations." NASA TM-107423, AIAA-97-0174, 35th Aerospace Sciences Meeting & Exhibit. Reno, Nevada, Jan. 6-10, 1997.
"Environmental Impact and Benefit Assessment for Proposed Effluent Limitation Guidelines and Standards for the Airport Deicing Category," Jul. 2009.
S. Farhadi et al., "Anti-Icing Performance of Superhydrophobic Surfaces," Applied Surface Science, 257 (2011) 6264-6269.
Y. Wang et al., "Verification of Icephobic/Anti-icing Properties of a Superhydrophobic Surface," ACS applied materials & interfaces 2013, 5, pp. 3370-3381.
L. Cao et al., "Anti-Icing Superhydrophobic Coatings," Langmuir 2009, 25, (21), pp. 12444-12448.
S. Deville et al., "An Ice-Structuring Mechanism for Zirconium Acetate." Langmuir 2012, 28, 14892-14898.
I. Grunwald et al., "Philosophical Transactions of the Royal Society A: Micmicking Biopolymers on a Molecular Scale: Nano(bio)technology Based on Engineered Proteins," Phil. Trans. R. Soc. A (2009), 367, pp. 1727-1747.
T. Inada et al., "Inhibition of Recrystallization of Ice Grains by Adsorption of Poly(Vinyl Alcohol) onto Ice Surfaces," Crys. Growth Des. 2003, 3, 747-752.
M. R. Anklam et al., "An Interfacial Energy Mechanism for the Complete Inhibition of Crystal Growth by Inhibitor Adsorption" J. Chem. Phys. 123, 144708 (2005).
H. Nada et al., "Anisotropy in Structural Phase Transitions at Ice Surfaces: A Molecular Dynamics Study." Appl. Surf. Sci. 1997, 121/122, p. 445-447.
J. F. Van Der Veen et al., "Melting and Freezing at Surfaces." Surface Science 433-435, (1999) pp. 1-11.
Y. Dai et al., "Molecular Dynamics Simulations of Template-Assisted Nucleation: Alcohol Monolayers at the Air-Water Interface and Ice Formation." J. Phys. Chem. B. 2001, 105, pp. 10831-10837.
Kamat, V et al., "Tetrahedron: Ring Closing MetathesisDirected Synthesis of (R)-(±)-Muscone from (+)-Citronellal." Tetrahedron 56, (2000) pp. 4397-4403.
Plimpton, S., "Fast Parallel Algorithms for Short-Range Molecular Dynamics." J. Comp. Phys. 1995, vol. 117, pp. 1-19, Mar. 1995.
W. G. Hoover, "Canonical Dynamics: Equilibrium Phase-Space Distributions." Phys Rev. A Mar. 1985, vol. 31, No. 3, pp. 1695-1697.
Mayo, S. et al., Dreiding: "A Generic Force Field for Molecular Simulations." J. Phys. Chem. 1990, vol. 94, pp. 8897-8909.
Vanommeslaeghe, K., Charmm "General Force Field: A Force Field for Drug-Like Molecules Compatible with the CHARMM All-Atom Additive Biological Force Fields." J.Comp. Chem. 2010, vol. 31, No. 4, pp. 671-690.
Aragones.J.L., et al., "Properties of Ices at 0 K: A Test of Water Models." J. Chem. Phys. 127, 154518 pp. 1-10 (2007).
McBride, T. et al., "Quantum Contributions in the Ice Phases: The Path to a New Empirical Model for Water—TIP4PQ/2005." J. Chem. Phys. 2009, 131, 024506, 1-13.

(56) References Cited

OTHER PUBLICATIONS

T. Greene et al., "Protective Groups in Organic Synthesis," J. Wiey & Sons, Inc., Third Ed., New York, 1999, Chapter 2, pp. 127-141 and Chapter 10, pp. 708-711.
Corey, E. J. et al. "Protection of Hydroxyl Groups as tert-Butyldimethylsilyl Derivatives," J. Am. Chem. Soc., 1972, 94 (17), pp. 6190-6191.
Z. V. Belyakova et al., "Effect of Catalysts on the Reaction of Allyl Esters with Hydrosilanes." Russian J. Gen. Chem 2010, vol. 80, No. 4, pp. 728-733.
R.M. Silverstein et al., "Spectroscopic Identification of Organic Compounds," Chapter 3, pp. 95-106, Chapter 4, pp. 181-212 and Chapter 5, pp. 249-278; 4th ed., John Wiley & Sons, 1981.
J. S. Davies et al., "Protection of Hydroxyl Groups by Silylation: Use in Peptide Synthesis and as Lipophilicity Modifiers for Peptides," J. Chem. Soc. Perkin Trans. 1992. 1, 3043-3048.
Kaelble. D.H. Dispersion-Polar Surface Tension Properties on Organic Solids. The Journal of Adhesion, 1970, 2. 66-81.
A. J. Meuler et al. Relationships between Water Wettability and Ice Adhesion, ACS Appl. Mater. Interfaces 2010, 2, 3100-3110.
E.H. Cirlin et al., "Roughness and Anisotropy Effects on Wettability of Polytetrafluoroethylene and Sodium-treated Polytetrafluoroethylene," Journal of Polymer Science: Polymer Physics Edition.
C.J. Van Oss et al., "Surface Tension Parameters of Ice Obtained from Contact Angle Data and from Positive and Negative Particle Adhesion to Advancing Freezing Fronts", J. Adhesion Sci, Technol., vol. 6, No. 4, pp. 503-516 (1992).
J. Kloubek, "Calculation of Surface Free Energy Components of Ice According to Its Wettability by Water, Chlorobenzene, and Carbon Disulfide." Journal of Colloid and Interface Science, 1974, 46, 185-190.
J.C. Mankins Technology Readiness Levels: A White Paper. NASA Office of Space Access an Technology, Advanced Concepts Office. Apr. 6, 1995, 5 Pgs.
K. Li et al. "Investing the Effects of Solid Surfaces on Ice Nucleation." Langmuir 2012, 28, 10749-1054.
D. Rozmanov et al., "Temperature Dependence of Crystal Growth of Hexagonal Ice (Ih)." Physical chemistry chemical physics : PCCP 2011, 13, 15501-15511.
W.L. Jorgensen et al "Comparison of Simple Potential Functions for Simulating Liquid Water." J. Chem. Phys. 1983, 79, 926-935.
D. Bai et al, "Microsecond Molecular Dynamics Simulations of the Kinetic Pathways of Gas Hydrate Formation from Solid Surfaces." Langmuir the ACS journal of surfaces and colloids.: 2011, 27, 5961-5967.
S.J. Riley at al., "A Terrain Ruggedness Index that Quantifies Topographic Heterogeneity," Intermountain J. Sci. 1999, 5, 1-4.
P. M. Rodger et al., "Simulations of the Methane Hydrate / Methane Gas Interface near Hydrate Forming Conditions," Fluid Phase Equil. 1996, 116, 326-332.
L. A. Baez et al., "Computer Simulation of the Crystal Growth and Dissolution of Natural Gas Hydrates," Ann. N.Y. Acad. Sci. 1994, 715, 177-186.
F. Paesani et al., "Quantum Effects Strongly Influence the Surface Premelting of Ice." J. Phys. Chem. C. 2008, 112, 324-327.

\* cited by examiner

HYDROGEN-BONDING SURFACES FOR ICE MITIGATION

CROSS-REFERENCE TO RELATED APPLICATION(S)

This patent application claims the benefit of and priority to U.S. Provisional Patent Application No. 62/095,158 entitled "Hydrogen-Bonding Surfaces for Ice Mitigation" filed Dec. 22, 2014 and U.S. Provisional Patent Application No. 62/160,275 entitled "Hydrogen-Bonding Surfaces for Ice Mitigation" filed May 12, 2015. The contents of both applications are hereby incorporated by reference in their entireties.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Ice formation on aircraft surfaces affects performance by increasing weight, creating drag, and loss of lift. In general, icing can occur: 1) while the aircraft is on the ground prior to take-off at airports in cold regions during the winter months; and 2) while in-flight any time throughout the year.

Ground icing of aircraft usually results from freezing conditions that occur during frost, snow, and ice/freezing rain storms. Such events result in coverage of the entire aircraft with impregnation of control surfaces.

Impact icing (i.e. in-flight) occurs when supercooled water droplets impinge and freeze on aircraft surfaces in clouds at temperatures at or below freezing. The term cloud droplet is generally used to describe particles smaller than 0.1 mm in diameter. Typically in nature, median droplet diameters encountered are less than 20 µm. Because of their relatively small size, droplets can exist in a supercooled liquid state in natural clouds down to −20° C., and can be encountered (though, less frequently) at −30° to −35° C., and even have been encountered even as low as −40° C. in the laboratory. However, other droplet diameters and size distributions cannot be neglected. Special cases include freezing drizzle, which denotes droplets in the 50-400 µm range, and freezing rain (typically −15° to +5° C.), which is composed of very large droplets, up to 5 mm in size. If the droplets freeze on impact, as is the case at temperatures well below freezing, relatively lower speeds, and/or lower water contents, the result is rime ice. Rime ice is characterized by a white, opaque, relatively streamlined appearance. At temperatures closer to freezing, higher speeds and/or higher water content, not all the impinging droplets freeze on impact. Some of the impinging water runs along the surface before freezing, a term called runback. This regime results in what is known as glaze ice, typified by a translucent appearance, often exhibiting large hornlike structures. Glaze ice is the most difficult type to detect visually. A parameter known as the freezing fraction helps quantify the two regimes: if the freezing fraction is 1, the ice is rime. If freezing fraction is <1, the ice is considered glaze. Mixed ice, as the name implies, is a combination of both clear/glaze and rime. The rate at which impinging water freezes is driven by heat transfer from the aircraft surface, and includes a complicated balance of mechanisms: kinetic heating, convective cooling, latent heat, sensible heat, and evaporative cooling. The presence of runback is most likely where surface tension comes into play.

Current strategies used to alleviate icing problems involve pneumatic boots, heated surfaces, and deicing agents (i.e. ethylene and propylene based glycols). Besides potential environmental concerns, ground application of deicing agents can impede efficient throughput of air traffic at airports during the winter months. Thus, a passive, rather than active approach, is desirable since it would minimize the need of applying deicing agents (i.e., ground and in-flight), as well as being always responsive to an icing event. Anti-icing coatings are a passive approach that would be applied to the aircraft surface either as a topcoat or as a constituent of aircraft paint. The application frequency for these coatings would ideally conform with routine aircraft maintenance and painting schedules.

Along this line, a number of anti-icing coating strategies have focused on superhydrophobic surfaces (SHS), where the inhibition of ice formation would occur via repulsion of impacting water. However, this repulsion does not prevent frost formation or water from freezing in a humid environment. When this occurs, water is no longer repelled, resulting in potential icing. In addition, the low ice adhesion strengths initially observed with these materials gradually degrade over repeated icing-deicing cycles.

BRIEF SUMMARY OF THE INVENTION

Various embodiments provide ice mitigating surface coatings and methods for applying ice mitigating surface coatings. Various embodiment ice mitigating surface coatings may be formed by hydrolysis of one or more substituted n-alkyldimethylalkoxysilanes terminated with functionalities having the following characteristics with respect to water: 1) non-polar interactions; 2) hydrogen bonding through donor and acceptor interactions; or 3) hydrogen bonding through acceptor interactions only. The substituted n-alkyldimethylalkoxysilanes of the various embodiments may include methyl terminated species, hydroxyl terminated species, ethylene glycol terminated species, and methoxy-ethylene glycol terminated species. Various embodiment ice mitigating surface coatings may be applied to metal surfaces, such as aluminum or aluminum alloy surfaces.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1A:
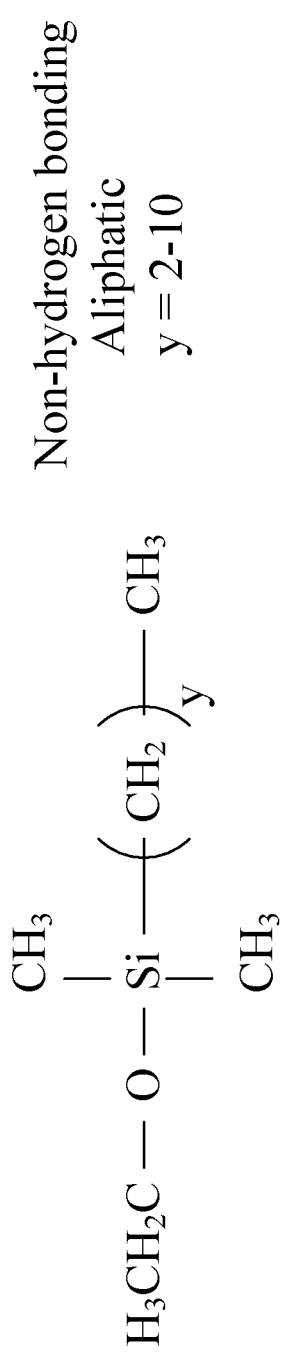
FIGS. 1A and 1B illustrate substituted n-alkyldimethylalkoxysilanes according to the various embodiments.
Figure 1A:
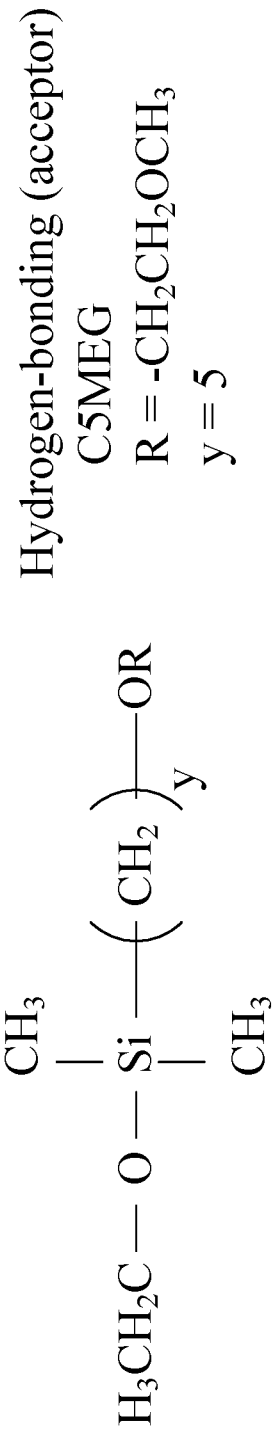

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

A direct anti-icing mechanism generates a hydrophilic surface with hydrogen-bonding (HB) capabilities similar to anti-freeze proteins (AFPs) found in certain fish and amphibians. This biomimetic approach may result in ice growth inhibition and ice formation prevention via an adsorption mechanism. One approach may be an AFP possessing HB side-groups (i.e. hydroxyl) strategically located to maximize crystal growth inhibition via adsorption of ice crystals. Antifreeze protection may arise from the molecular structure and may be what is known as a constitutive property. In comparison, the addition of a material (e.g. salt) to depress the freezing point may be what is known as a colligative property. The general characteristics of AFPs are thermal hysteresis: reduction in freezing point, ice recrystallization inhibition, and ice structuring (change in ice crystal morphology). Research was conducted to directly incorporate AFPs from a winter flounder into a coating. Testing of this material afforded promising results, but durability was found to be an issue, presumably due to AFP denaturation which leads to a loss of activity. Thus, generation of a surface with similar morphology to an AFP, but with a more robust matrix, may yield AFP properties while overcoming durability issues.

Further research has shown similar effects with poly(vinyl alcohol), where the alcohol groups bind to the ice crystal via HB and inhibit additional ice growth. However, poly(vinyl alcohol) may be a poor candidate for surface modification due to its high solubility in water. Additionally, it has been demonstrated that HB between water and alcohols contributes to inhibition of crystal growth. This highlights how an adsorbed crystal on an inhibitor (e.g., AFP) creates a difference in surface energy between the adsorbed crystal and any further crystal growth. In short, that research derived the following relationship for critical growth inhibition $$(\Delta\mu)_c = a\Delta\sigma.$$

Where "$(\Delta\mu)_c$" is the difference in chemical potential between the old and new crystal, "a" is the area of contact between the old crystal and the liquid solution, and "$\Delta\sigma$" is the difference in surface energy. If $a\Delta\sigma$ is larger than $\Delta\mu$, the thermodynamic driving force to add a new crystal layer cannot overcome the energy or work requirement.

Based on AFP characteristics (i.e. adsorption), this research postulated that direct interaction of water with a HB surface may reorient water molecules, may disrupt initial ice nucleation, and may induce defect propagation because of the competition between water molecules and a HB surface for HB partners. In contrast to interactions on a SHS, an ice crystal could absorb to a HB surface, thus lowering the interfacial tension and potentially creating a larger free energy barrier to further ice crystal growth. In addition, a proper HB surface designed for optimal adsorption and interaction has the potential to enhance the quasi-liquid layer (QLL) formed at the surface/ice interface. Specifically, the QLL forms the interface between surfaces and ice crystals. Due to the low temperatures, the water is solid-like. However, because of the presence of a surface, the water cannot form the same type of crystalline network, resulting in the retention of liquid-like properties.

Research using pure methyl and hydroxyl terminated C11 aliphatic chains and mixtures of these upon a gold substrate indicated that the hydrophilic surface prepared from the hydroxyl terminated chain exhibited higher ice adhesion strength than the hydrophobic coated surface. Additionally, a mixture of the two components (hydroxyl and methyl terminated C11 chains) provided a linear relationship with respect to ice shear strength that increased with increasing hydroxyl component. These surfaces were molecularly smooth due to similar chain lengths of the two materials.

Molecular dynamic (MD) simulations on alcohol-terminated monolayers were performed to investigate how monolayers of uniform length promote ice growth. This study showed that alcohols arranged in a specific way can initiate a "template" for new ice crystal formation, which catalyzed crystal growth on the surface. An odd-number of carbons in the surface modifier alkyl chain were found to enable better exposure of the alcohol to the water molecules, minimize surface roughness, and serve as a better initial template for crystal growth. Roughness was defined as the average deviation of the oxygen's distance to a reference plane. With even-numbered modifiers, the tilting of the alcohol group results in surfaces that do not serve as good templates for ice growth and that exhibit greater surface roughness. Although the exposure is a contributing factor, a smooth surface may be necessary for growth promotion. Thus a molecularly rough surface should disrupt ice growth.

The various embodiments provide ice mitigating surface coatings. The various embodiment ice mitigating surface coatings may include substituted n-alkyldimethylalkoxysilanes having one or more of the following characteristics with respect to water: 1) non-polar interactions; 2) hydrogen bonding through donor and acceptor interactions; and 3) hydrogen bonding through acceptor interactions only. The substituted n-alkyldimethylalkoxysilanes of the various embodiment ice mitigating surface coatings may include methyl terminated species, hydroxyl terminated species, ethylene glycol terminated species, and methoxyethylene glycol terminated species. Various embodiment ice mitigating surface coatings may be applied to metal surfaces, such as aluminum or aluminum alloy surfaces, other metal or metal alloy surfaces, etc.

Various embodiments may provide methods for passively providing anti-icing for a metal surface, such as an aluminum surface, including spray depositing an ice mitigating surface coating on the metal surface, the ice mitigating surface coating formed from the hydrolysis of one or more substituted n-alkyldimethylalkoxysilane, and heating the coated metal surface at a selected temperature for a selected time. In various embodiments, the selected temperature may be approximately 110° C., such as below 110° C., above 110° C., at 100° C., etc., and the selected time may be approximately 15 minutes, such as less than 15 minutes, greater than 15 minutes, 15 minutes, etc. In various embodiments, the ice mitigating surface coating formed from one or more substituted n-alkyldimethylalkoxysilane may be spray deposited using coupling agent processes, such as those described in E. P. Plueddemann, "Silane Coupling Agents", Plenum Press, New York, 1982, hereby incorporated by reference in its entirety. In various embodiments, the one or more substituted n-alkyldimethylalkoxysilane may be added to a mixture of ethanol, water, and methylene chloride to prepare a solution for spray depositing on the metal surface as the ice mitigating surface coating. In various embodiments, acid, such as glacial acetic acid, may be added to the solution of the one or more substituted n-alkyldimethylalkoxysilane, ethanol, water, and methylene chloride. The addition of the acid, such as glacial acetic acid, another acid, etc., may result in hydrolysis (e.g., acidic hydrolysis) of the one or more substituted n-alkyldimethylalkoxysilane to form silanol that may react with the metal surface when the solution is applied (e.g., spray deposited) on the metal surface as an ice mitigating surface coating. In various embodiments, the one or more substituted n-alkyldimethylalkoxysilane may be terminated with a functionality having a non-polar interaction with respect to water. In various embodiments, the one or more substituted n-alkyldimethylalkoxysilane may be two n-alkyldimethylalkoxysilanes each having a different number of carbons in its respective aliphatic chain. In various embodiments, the one or more substituted n-alkyldimethylalkoxysilane may be terminated with a functionality having hydrogen bonding through donor and acceptor interactions with respect to water. In various embodiments, the one or more substituted n-alkyldimethylalkoxysilane may be terminated with a functionality having hydrogen bonding through only acceptor interactions with respect to water. In the various embodiments, the one or more substituted n-alkyldimethylalkoxysilane may be a first n-alkyldimethylalkoxysilane terminated with a functionality having a non-polar interaction with respect to water and a second n-alkyldimethylalkoxysilane terminated with a functionality having hydrogen bonding through donor and acceptor interactions with respect to water. In the various embodiments, the one or more substituted n-alkyldimethylalkoxysilane may be a first n-alkyldimethylalkoxysilane terminated with a functionality having a non-polar interaction with respect to water and a second n-alkyldimethylalkoxysilane terminated with a functionality having hydrogen bonding through only acceptor interactions with respect to water. In the various embodiments, the one or more substituted n-alkyldimethylalkoxysilane may be mixture of different substituted n-alkyldimethylalkoxysilanes terminated with functionalities having hydrogen bonding through donor and acceptor interactions with respect to water. In the various embodiments, the one or more substituted n-alkyldimethylalkoxysilane may have a saturated aliphatic chain or a partially unsaturated aliphatic chain. In various embodiments, the one or more substituted n-alkyldimethylalkoxysilane may have an aliphatic chain that is linear or branched. In this manner, the nature of the fourth attachment to the silicon atom in the various embodiment substituted n-alkyldimethylalkoxysilanes may be of a saturated aliphatic chain that is either linear or branched or may be a partially unsaturated aliphatic chain that is either linear or branched.

Figure 1B:
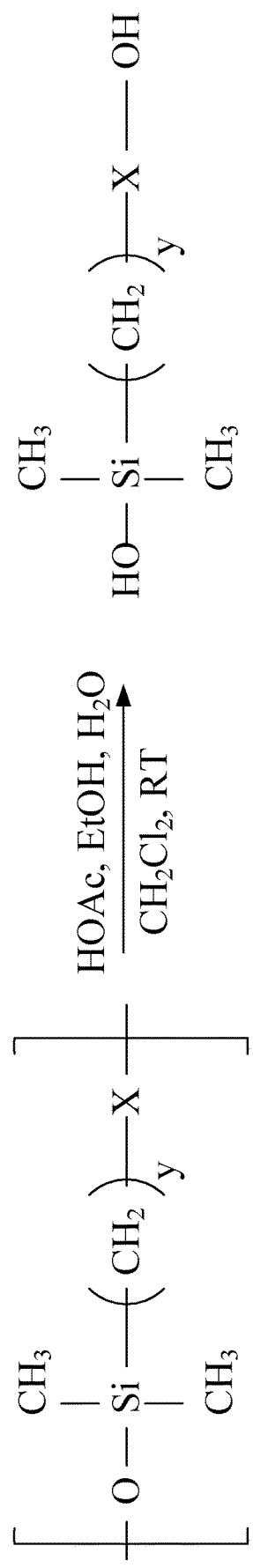

FIGS. 1A and 1B illustrate substituted n-alkyldimethylalkoxysilanes according to the various embodiments including functionalities having the following characteristics with respect to water: 1) non-polar interactions (aliphatic, A) (FIG. 1A), 2) hydrogen bonding (HB) through donor and acceptor interactions (hydroxyl, H; ethylene glycol, EG) (FIG. 1B), and 3) HB through acceptor interactions only (methoxyethylene glycol, MEG) (FIG. 1A). FIG. 1B specifically illustrates the generation process for the silanol and hydroxyl (H) and silanol and ethylene glycol (EG) groups formed by hydrolysis of the substituted n-alkyldimethylalkoxysilane precursor. In various embodiments, the value y for the aliphatic substituted dimethylalkoxysilanes may be from 2 to 10, such as 2, 6, or 10. In various embodiments, X may be—(i.e. a bond) and the value y for the hydroxyl substituted dimethylalkoxysilanes may be from 7 to 11, such as 7, 10, or 11. In various embodiments, X may be —$OCH_2CH_2$— and the value y for the ethylene glycol substituted dimethylalkoxysilanes may be 2. In various embodiments, hydrogen bonding through donor and acceptor interactions material may be a hydrolysable polymer that affords both a reactive silanol and the hydroxyl or ethylene glycol moiety on the opposing terminus. In various embodiments, R may be —$CH_2CH_2OCH_3$ and the value y for the methoxyethylene glycol substituted dimethylalkoxysilanes may be 5. The substituted n-alkyldimethylalkoxysilanes may have a saturated aliphatic chain or a partially unsaturated aliphatic chain and/or may have an aliphatic chain that is liner or branched. In this manner, the nature of the fourth attachment to the silicon atom in the various embodiment substituted n-alkyldimethylalkoxysilanes may be of a saturated aliphatic chain that is either linear or branched or may be a partially unsaturated aliphatic chain that is either linear or branched.

Various embodiments may provide a surface, such as a surface for aircraft, wind turbines, or other moving and/or static structures subject to icing conditions, including a metal layer, such as an aluminum or aluminum alloy layer, other metal or metal alloy layer, etc., and an ice mitigating surface coating according to the various embodiments deposited on the metal layer.

The various embodiments described herein are illustrated by, and discussed in relation to, specific example substituted n-alkyldimethylalkoxysilanes. While these specific example substituted n-alkyldimethylalkoxysilanes are discussed herein, other alkoxysilanes may be suitable for use in the various embodiments, and may be substituted for the specific example substituted n-alkyldimethylalkoxysilanes. For example, the dimethyl groups of the specific example substituted n-alkyldimethylalkoxysilanes discussed herein may be other alkyl groups, such as ethyl, propyl, or mixtures thereof. As an additional example, while the alkoxy group in the specific example substituted n-alkyldimethylalkoxysilanes discussed herein may be represented as ethoxy, other alkoxy groups, such as methoxy, proxy, etc., may be used. As a further example, while the specific example substituted n-alkyldimethylalkoxysilanes discussed herein may be monoalkoxysilanes that may result in a single layer ice mitigating surface coating, dialkoxysilanes and trialkoxysilanes may be prepared that may result in multiple layer ice mitigating surface coating. Additionally, various combinations of one or more of the above example changes to the specific example substituted n-alkyldimethylalkoxysilanes discussed herein may be implemented together in the various embodiments.

Experiments

Surfaces with controlled chemical functionality and chain length were prepared on aluminum (Al) and investigated to assess the effect of both parameters upon ice adhesion strength under a simulated icing environment using the Adverse Environment Rotor Test Stand (AERTS) located at The Pennsylvania State University within the icing envelopes defined by 14 CFR Parts 25 and 29, Appendix C. Results from these experiments suggest that terminal group chemical composition and chain length effect ice adhesion shear strength (IASS).

n-Alkyldimethylalkoxysilanes, terminated with various organic functionalities, were prepared following known chemical procedures and characterized using spectroscopic techniques. Approximate 2% (w/v) solutions were prepared by adding the appropriate substituted dimethylalkoxysilane(s) to a mixture of ethanol:water:methylene chloride. Several drops of glacial acetic acid were then added to generate the corresponding silanol. The solutions were applied via spray coating to dry Al alloy 3003 [30.48 cm×30.48 cm, 0.016" (0.406 mm) thick] sheets that had been wiped with ethanol and treated with a cleaning solution followed by a water rinse. The coated samples were allowed to stand at room temperature (RT) overnight and then placed in an air oven at approximately 110° C. for 15 min. Test specimens were cut from the coated sheets for evaluation on AERTS (10.16 cm×15.24 cm) and contact angle goniometry (CAG). CAG was performed on a First Ten Angstroms FTA 1000B goniometer at RT using an 8 μL drop of water. Tilting axis measurements were utilized to measure sessile, advancing, and receding contact angles. IASS was determined on AERTS with the rotor operating at 400 rpm at −8, −12, and −16° C. The icing cloud density (i.e. liquid water content) was 1.9 g/m$^3$ with a water droplet mean volumetric diameter of 20 μm. Tests were conducted at each temperature in triplicate to assess coating durability. Due to the rotor configuration 2 specimens were examined during each test run. As the rotor turned at speed, ice accumulation and subsequent shedding enabled determination of the IASS after data analysis and visual assessment. The same sample was tested at all three test temperatures starting at −16° C. and ending at −8° C.

To generate a monolayer surface, substituted n-alkyldimethylalkoxysilanes were prepared via known chemical reactions with the exception of n-propyldimethylmethoxy silane, which was obtained from commercial sources. Structures for each material and their corresponding designation corresponded to those shown and discussed in relation to FIGS. 1A and 1B. The hydroxyl and ethylene glycol terminated species that were deposited on the Al surface originated from a hydrolysable polymer precursor. Upon hydrolysis, the material that was formed contained both a silanol and a hydroxyl or ethylene glycol group. The silanol group is what condensed with the Al surface. The functionalities investigated had the following characteristics with respect to water: 1) non-polar interactions (aliphatic, A) (FIG. 1A), 2) hydrogen bonding (HB) through donor and acceptor interactions (hydroxyl, H; ethylene glycol, EG) (FIG. 1B), and 3) HB through acceptor interactions only (methoxyethylene glycol, MEG) (FIG. 1A). Specifically, non-polar interaction functionalities were prepared with different chain lengths where the value of y was 2 (referred to herein as C3A), the value of y was 6 (referred to herein as C7A), and the value of y was 10 (referred to herein as C11A) as illustrated in FIG. 1A. HB functionalities exhibiting both donor and acceptor effects were prepared including ethylene glycol with the X being —OCH$_2$CH$_2$— and the value of y being two (referred to herein as EG) and hydroxyl with X being—(i.e. a bond) and the value of y being 7 (referred to herein as C7H), the value of y being 10 (referred to herein as C10H), and the value of y being 11 (referred to herein as C11H) as illustrated in FIG. 1B. Additionally, the HB functionality through acceptor interactions only was prepared where R was —CH$_2$CH$_2$OCH$_3$ and the value of y being 5 (referred to herein as C5MEG) as illustrated in FIG. 1A.

Neat and mixed functionalized Al surfaces were generated by spray deposition of these materials using coupling agent technology. In addition to functionality, chain length was varied to assess the effect of molecular scale roughness upon IASS. Characterization of these surfaces by CAG afforded the expected results. These surfaces, along with an uncoated Al control, were tested in AERTS at temperatures ranging from −8 to −16° C. under icing conditions described in the experimental section. In general, all coated Al surfaces performed better than the control.

Neat Surfaces
Aliphatic (A) Surfaces

Figure 2:
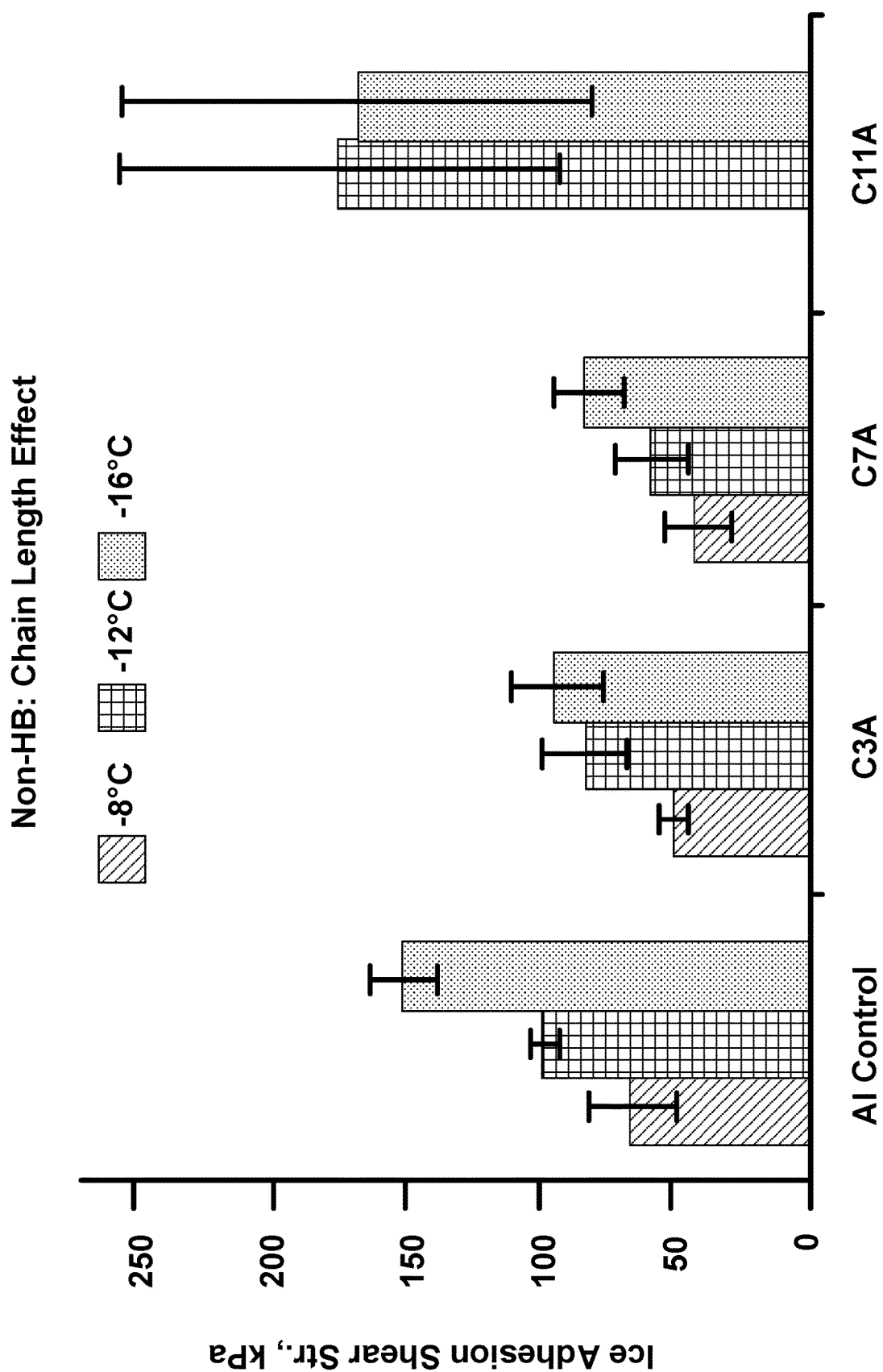
FIGS. 2-14 are graphs showing ice adhesion shear strength (IASS) experimental results for control aluminum surfaces and aluminum surfaces coated with various embodiment ice mitigating surface coatings.

Non-polar interactions with regard to IASS were examined using three linear aliphatic chain lengths. IASS lower than the control were obtained for the C3A and C7A surfaces with the latter performing better as illustrated in FIG. 2. Due to the short chain length of C3A, water may potentially still interact with the Al surface. Further increasing the distance between ice and Al with C11A resulted in a greater IASS along with surface degradation as evidenced by an increased IASS with increasing temperature (The accepted trend is that IASS decreases with increasing temperature). This degradation was attributed to strong ice clamping which may arise due to phase transition of the surface functionalities.

Hydroxy (H) and Ethylene Glycol (EG) Surfaces

Figure 3:
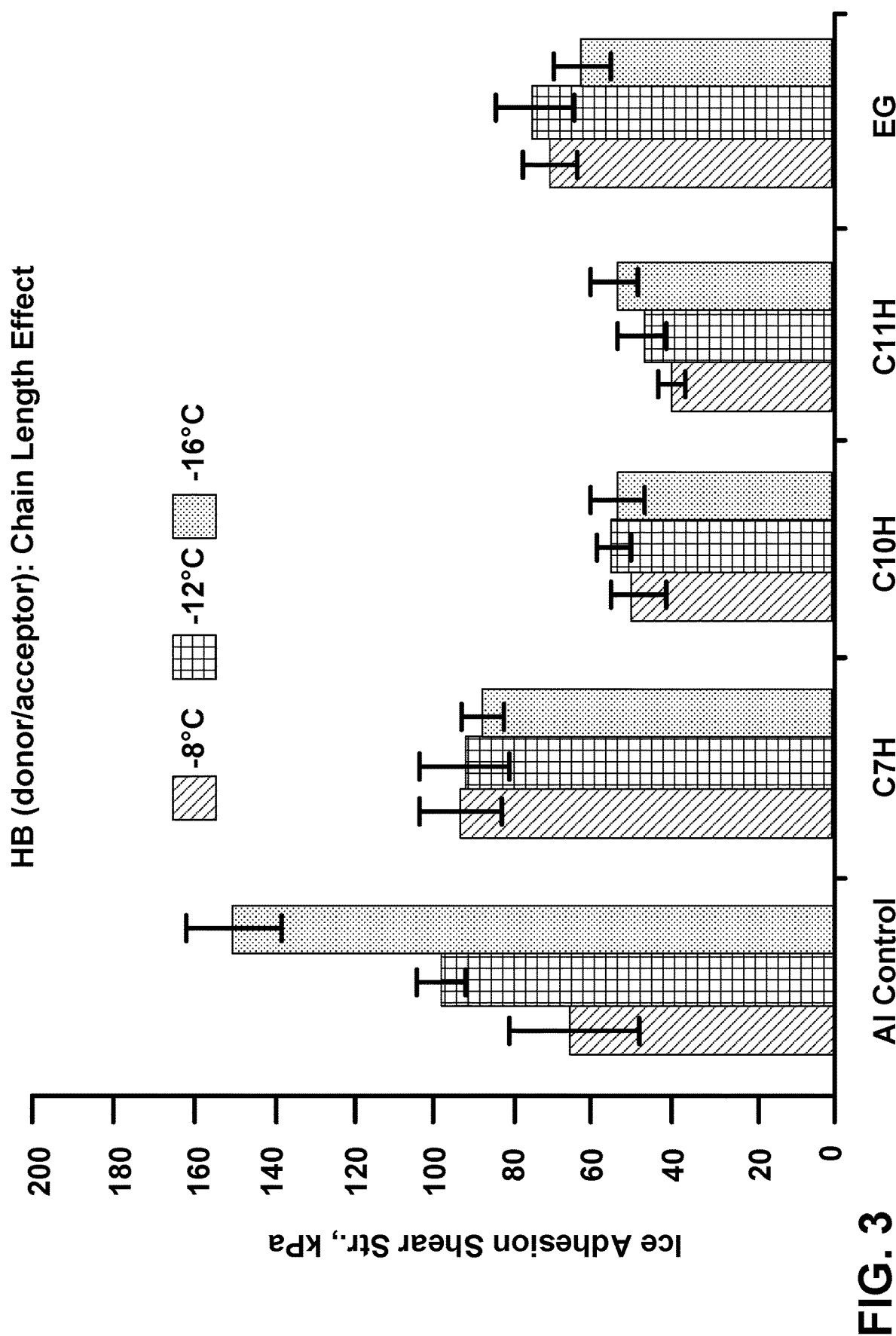

HB surfaces exhibiting both donor and acceptor effects with water were evaluated for IASS with H and EG surfaces as illustrated in FIG. 3. Regarding AERTS testing, it is accepted that as the temperature increases IASS decreases. The C10H and C11H surfaces follow this trend. At −16° C. the surfaces behave essentially the same. However, as the temperature increased C11H exhibited a slightly lower IASS than C10H suggesting an odd-even chain length effect with regards to the terminal hydroxyl group and ice. Some degradation may have occurred with C10H since the IASS remained relatively unchanged over the test temperature regime. C7H with a shorter chain length had a greater IASS at −16° C. compared to the other two H surfaces. In addition, the IASS on C7H increased with increasing temperature implying surface degradation due to strong ice clamping.

EG had a lower IASS than C7H, but showed similar degradation behavior. Since ethylene glycol is a component of antifreeze, it was assumed that the EG surface would exhibit a lower IASS. While ethylene glycol works well in an aqueous solution, this phenomenon does not translate well onto a dry Al surface. In general the IASS of the H and EG surfaces did not differ significantly between test temperatures.

Figure 4:
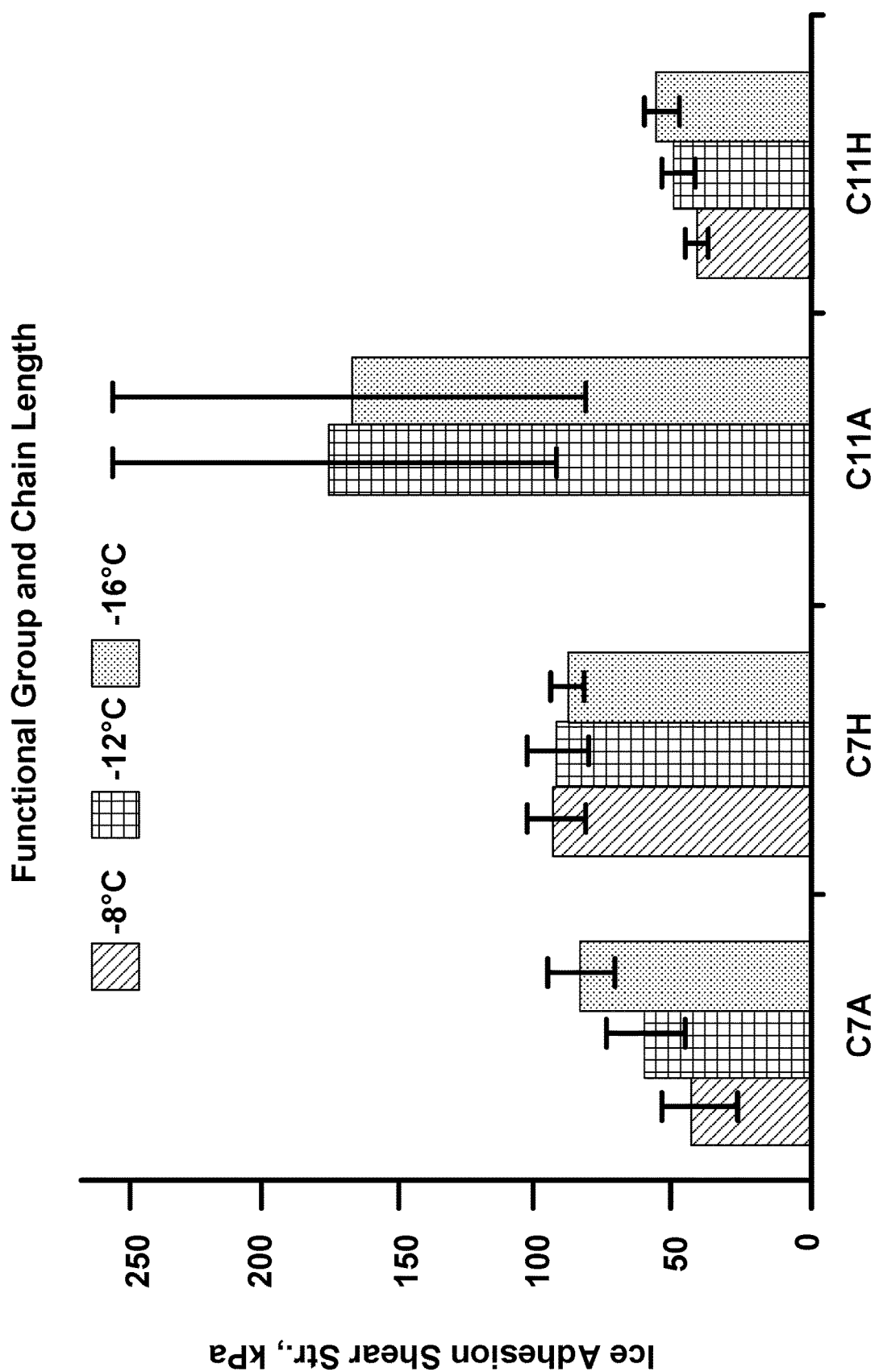

Comparing C7 and C11 A and H surfaces, it was determined that both functionality and chain length influenced IASS with shorter chain length A and longer chain length H exhibiting lower IASS as illustrated in FIG. 4. Surprisingly C11H did not show the same evidence of degradation as observed with C11A.

MEG Surface

Figure 5:
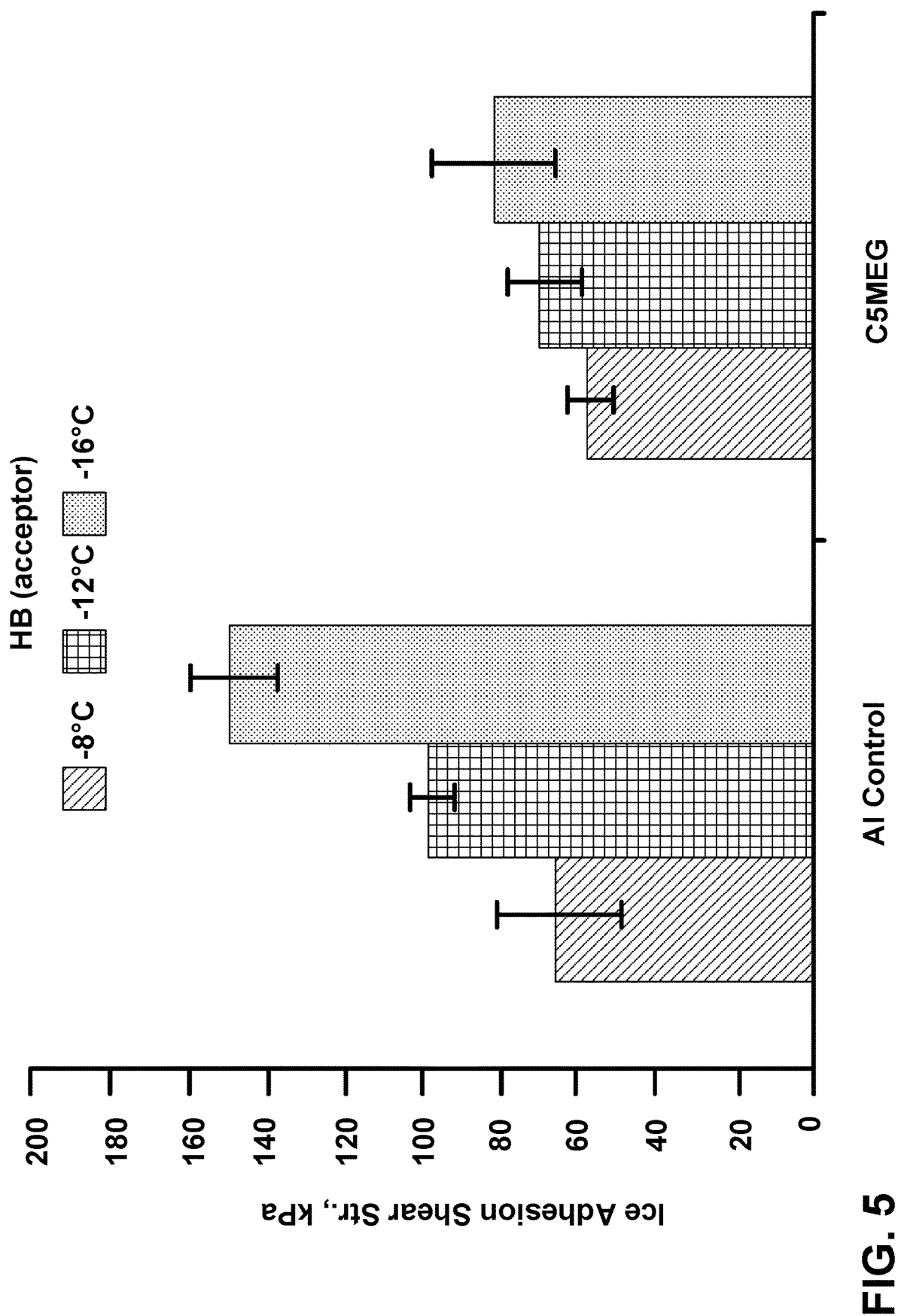

Based on the results of the above described surfaces, it was of interest to determine the effect of a HB surface that would interact with water only as an acceptor. Attempts to prepare a short chain methoxy terminated linear material were unsuccessful. Thus a methoxy terminated analog of EG, C5MEG, was prepared and used to coat the Al surface. The IASS of compounds with comparable chain length, but differing terminal group are shown in FIG. 5. IASS of C5MEG exhibited a similar trend as C7A suggesting that a HB donor effect of the H and EG surfaces with water would lead to strong interactions with ice.

Mixed C7A/C7H Surfaces

Figure 6:
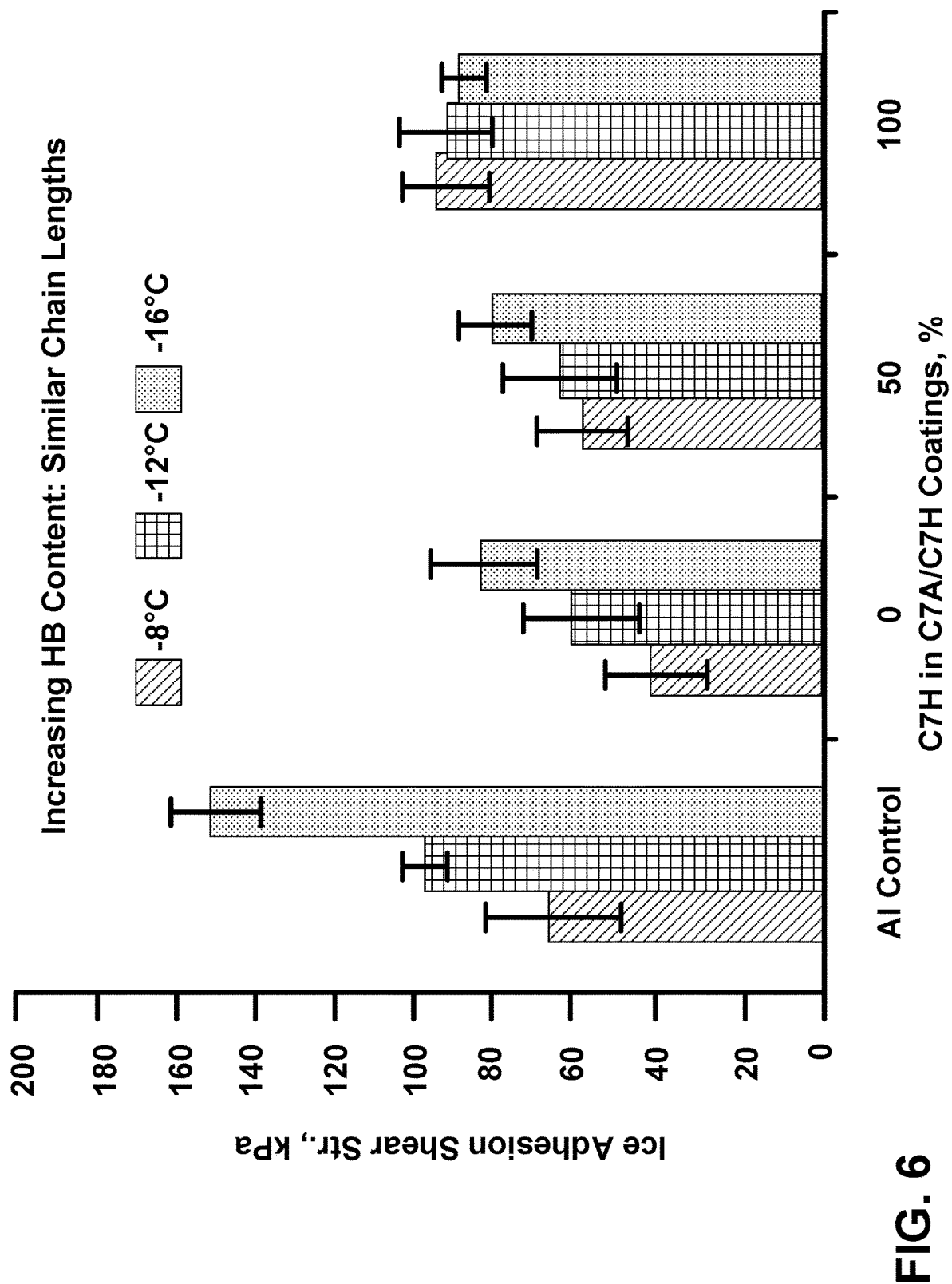

A 50/50 mixed C7 A and H surface was prepared to investigate the effect of increasing HB upon IASS. As shown in FIG. 6, at −8° C. a nearly linear increase was observed with increasing H content. At −12° C. this effect was less pronounced. These results are similar to those reported by Petrenko using linear C11 thiols bearing terminal methyl or hydroxyl groups on a gold surface. However, at −16° C. all the surfaces exhibited a similar IASS regardless of end group.

Mixed C3A/C7A Surfaces

Figure 7:
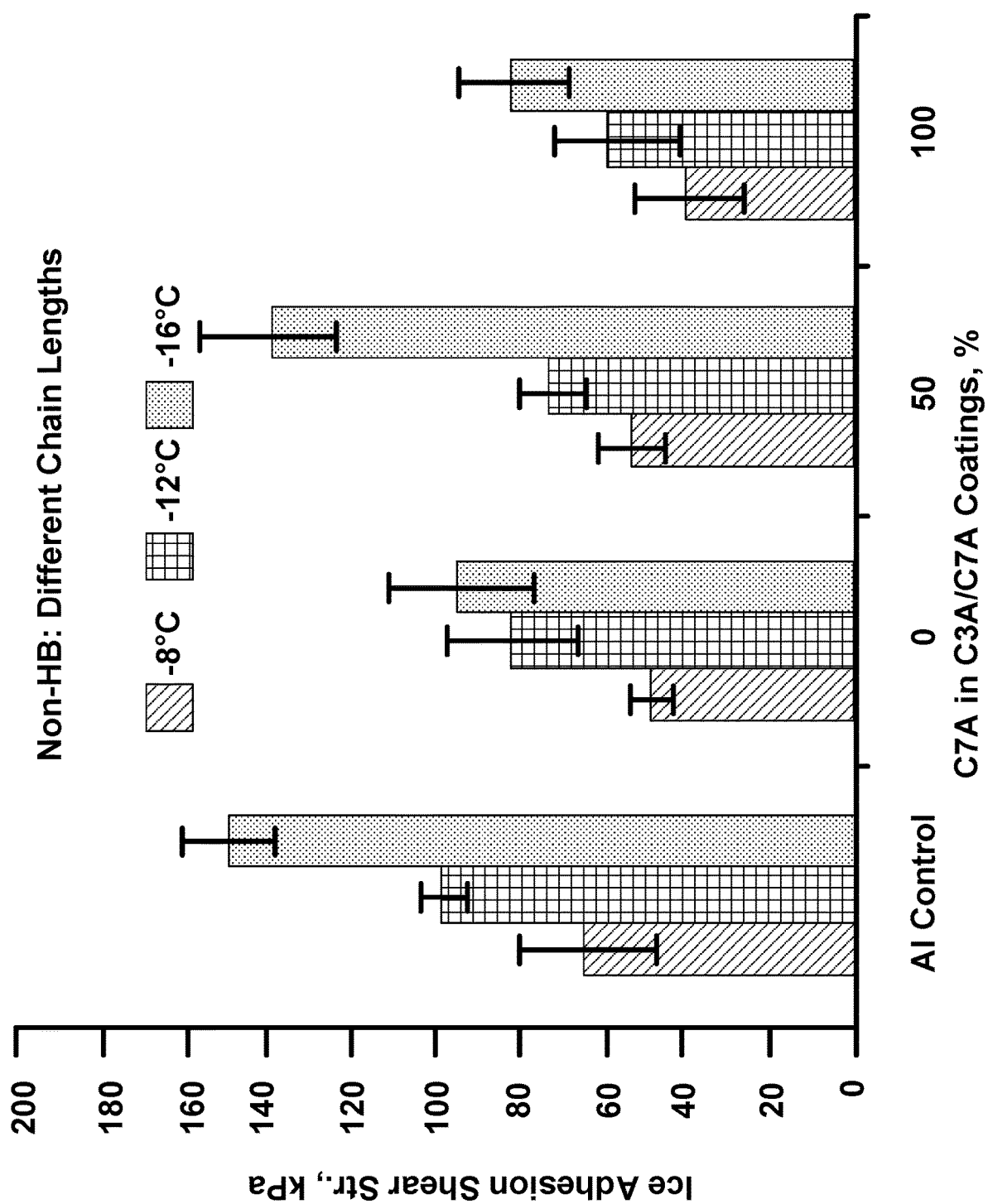
Figure 8:
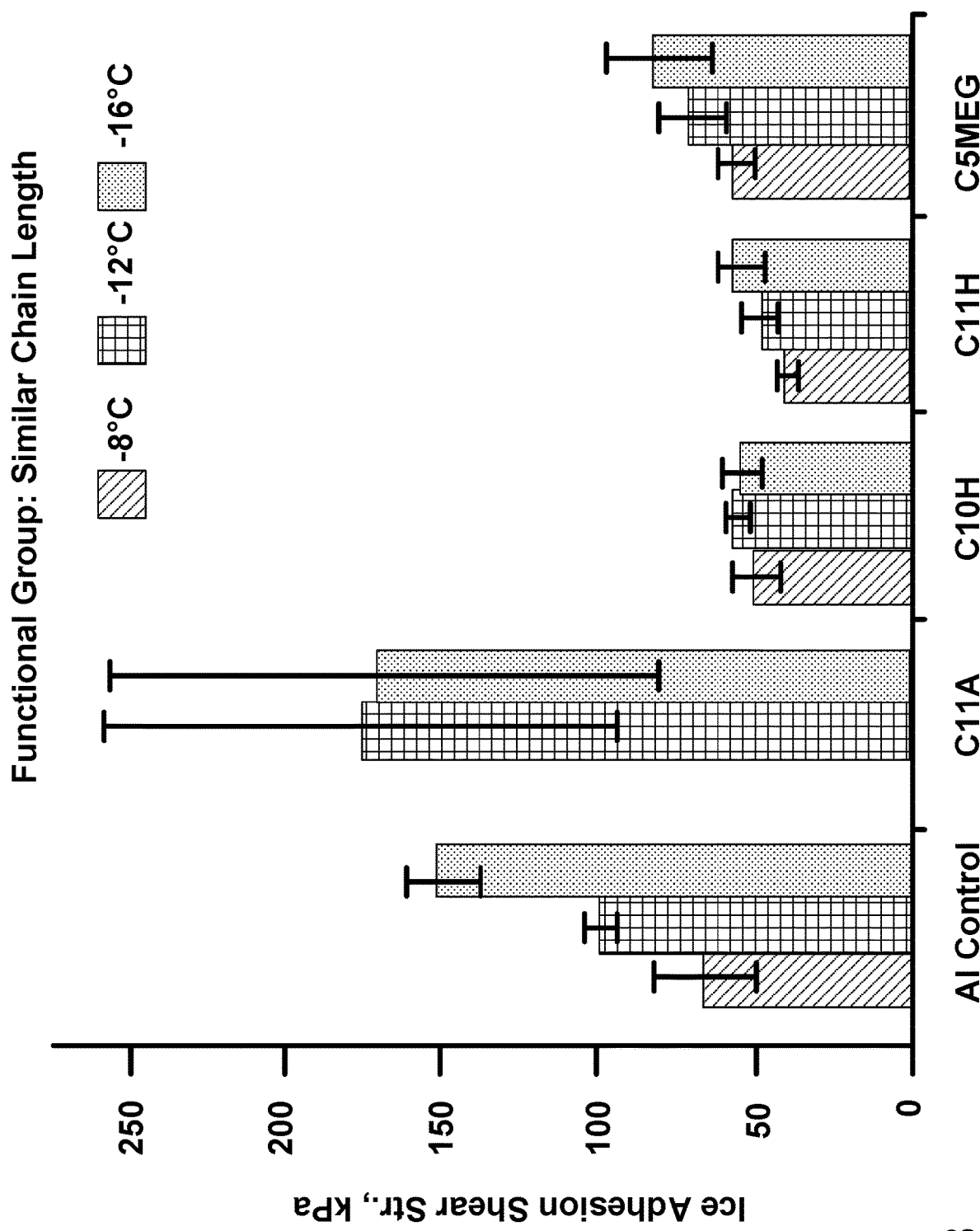
Figure 9:
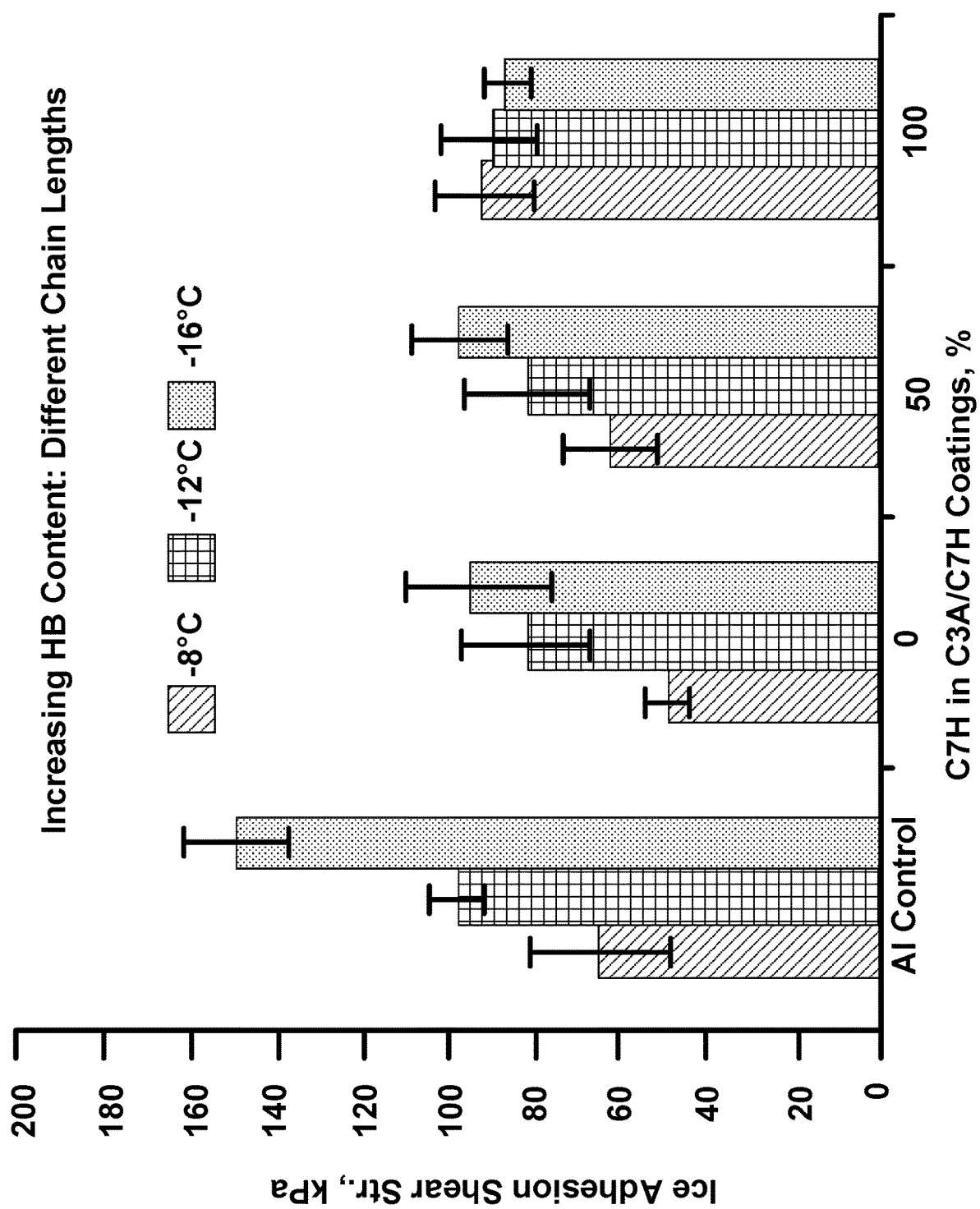
Figure 10:
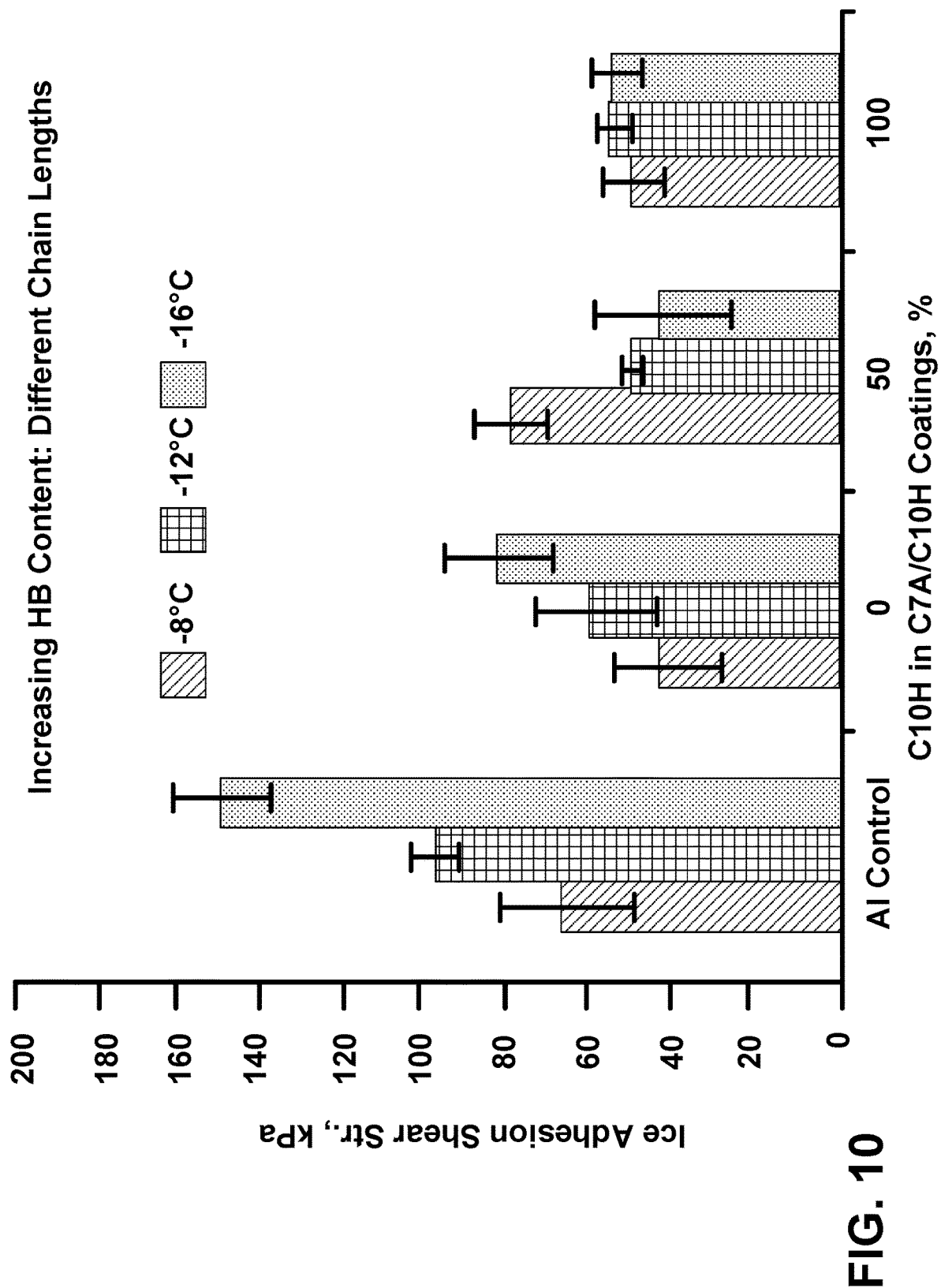
Figure 11:
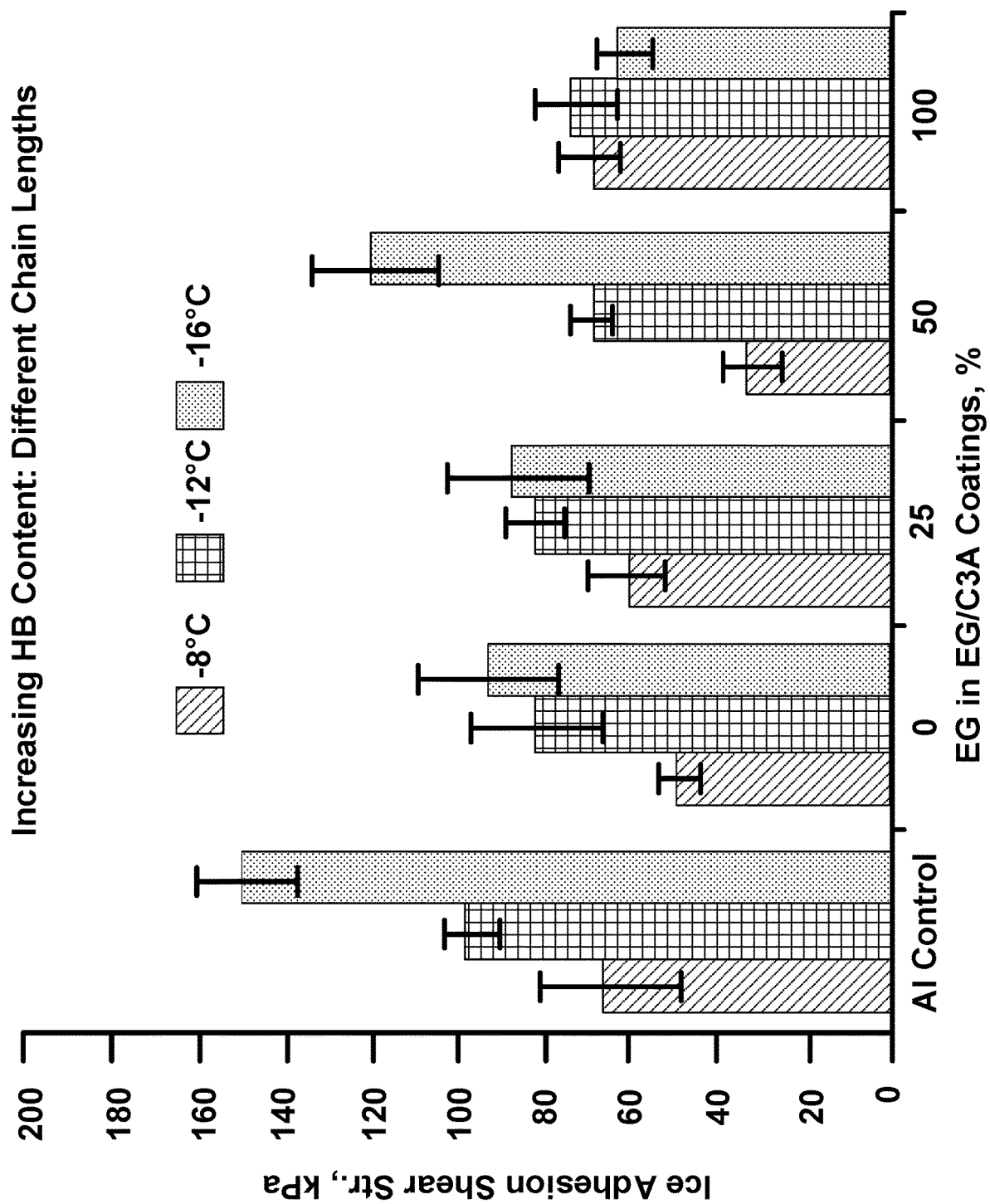
Figure 12:
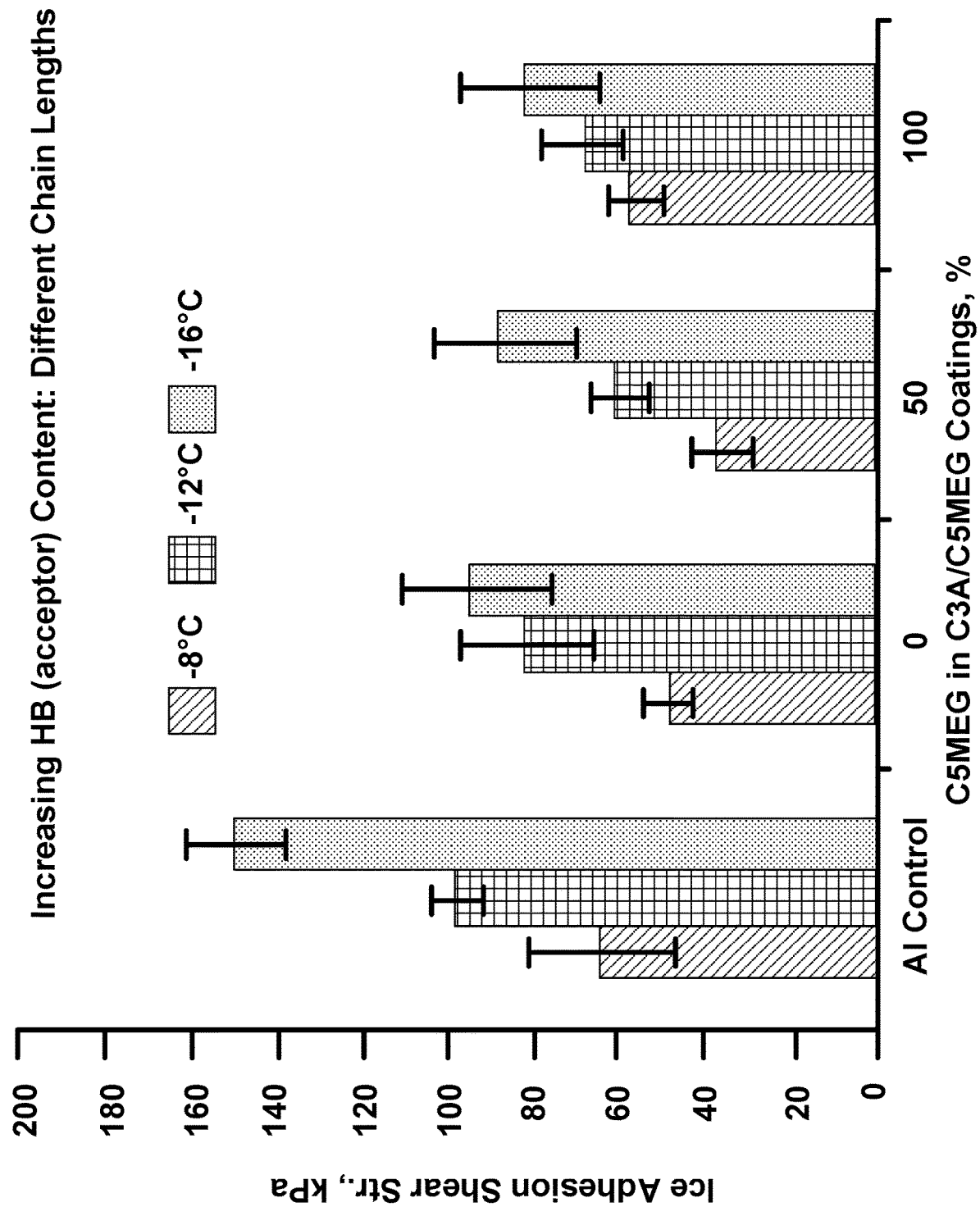
Figure 13:
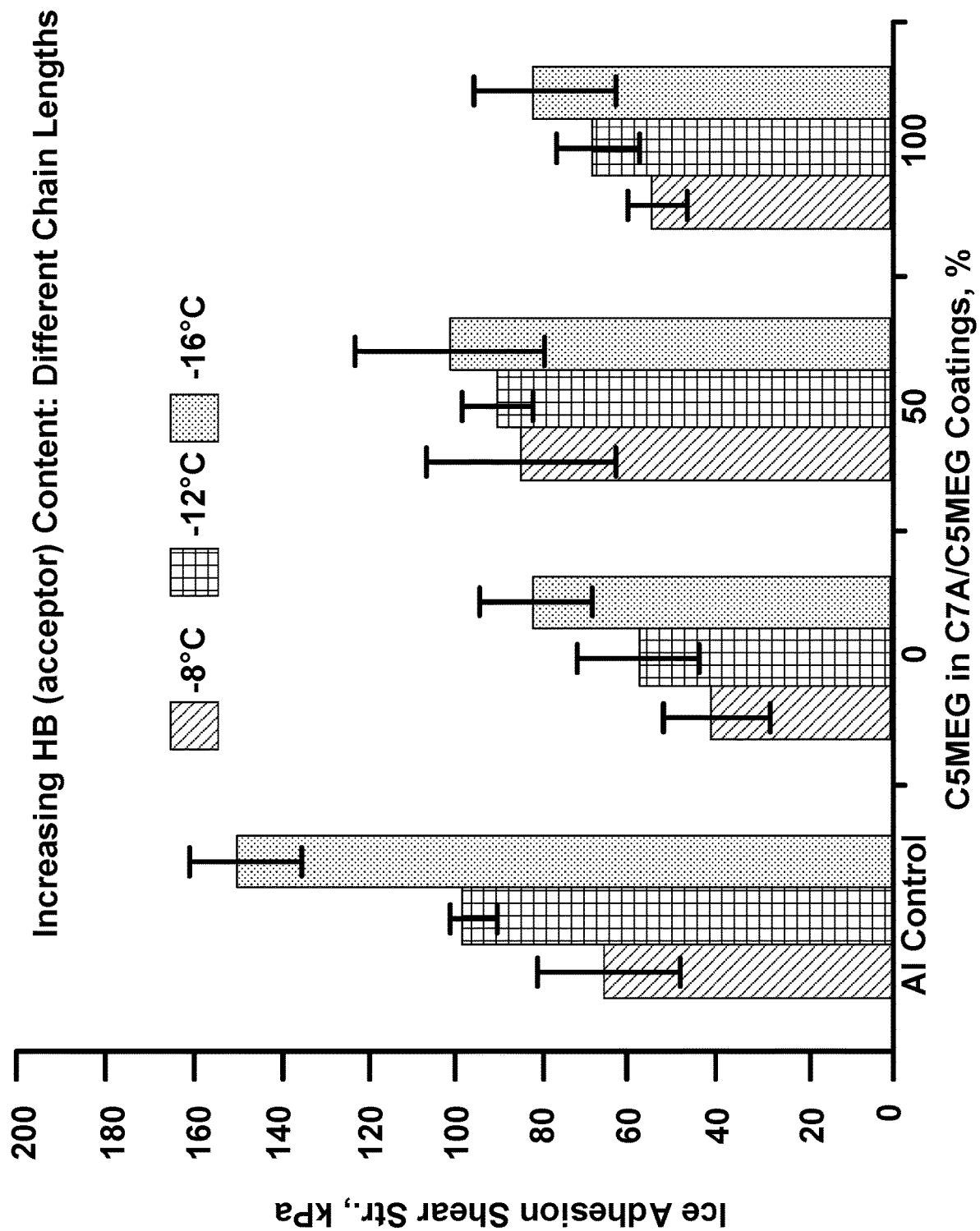
Figure 14:
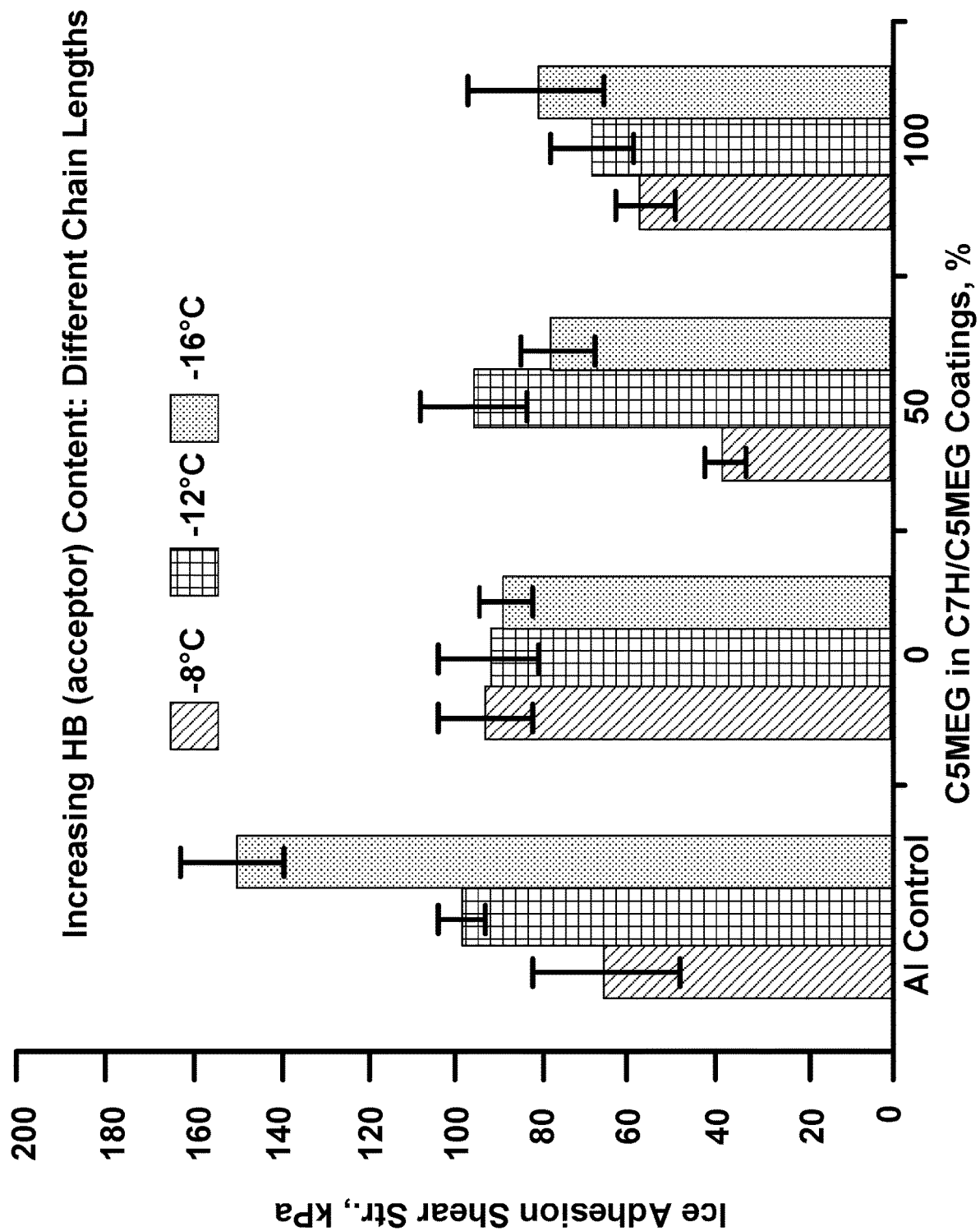

Coated surfaces were prepared to investigate the effect of mixed chain length towards IASS. Aliphatic surfaces were selected so as to negate HB effects. As seen in FIG. 7 the 50/50 C3A/C7A coating displayed a higher IASS at −8 and −16° C. than either pure component. In addition, the IASS at −16° C. for the 50/50 mix approached that of the uncoated control surface suggesting that ice was adhering to the exposed portion of the C7A chain via a clamping affect. These results suggested an enhanced accessibility of water to the Al surface. Interestingly, at −12° C. the IASS of these surfaces decreased with increasing C7A in a nearly linear manner. FIG. 8 illustrates the IASS results of the Al control, C11A, C10H, C11H, and C5MEG. FIG. 9 illustrates the IASS results of increasing amounts of C7H in a C3A/C7H coating. FIG. 10 illustrates the IASS results of increasing amounts of C10H in a C7A/C10H coating. FIG. 11 illustrates the IASS results of increasing amounts of EG in a EG/C3A coating. FIG. 12 illustrates the IASS results of increasing amounts of C5MEG in a C3A/C5MEG coating. FIG. 13 illustrates the IASS results of increasing amounts of C5MEG in a C7A/C5MEG coating. FIG. 14 illustrates the IASS results of increasing amounts of C5MEG in a C7H/C5MEG coating.

The effect of surface functionality and chain length towards IASS was investigated under simulated icing conditions. Surfaces functionalized with materials of comparable chain length exhibited higher IASS where the coating can interact with water through HB donor-acceptor effects. Chain length, temperature, and coating composition were observed to affect IASS with no general observable trend. In general, the following conditions were observed based on the experiments: 1) for non-polar interactions (aliphatic, A)—long aliphatic chains as described were found to degrade and exhibit high IASS. Very short chains resulted in decreased IASS which continued to decrease with a slightly longer aliphatic chain; 2) hydrogen bonding (HB) through donor and acceptor interactions (hydroxyl, H; ethylene glycol, EG)—short chains resulted in higher IASS than corresponding aliphatic materials. Longer chains provided decreased IASS without degradation; and 3) HB through acceptor interactions only (methoxyethylene glycol, MEG)—the neat surface displayed comparable IASS of the best performing surface under condition 1. Compared to a neat surface of condition 2 with comparable chain length, the surface did not experience degradation suggesting that hydrogen bond acceptance may be more beneficial than hydrogen bond donation. Mixed surfaces of the three different conditions afforded varied results. Generally the IASS was comparable or greater than the IASS of the best performing condition 1 surface. The results suggest that the functionalities described under conditions 1 and 3 may be more desirable for incorporation into ice mitigating surface coatings.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A method for passively providing anti-icing for a metal surface, comprising:
spray depositing a surface coating on the metal surface; and
heating the coated metal surface at a selected temperature for a selected time,
wherein the surface coating comprises:

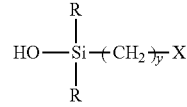

wherein:
X is OH or OCH$_2$CH$_2$OH;
y is from 2 to 11, and
R is an alkyl group.

2. The method of claim 1, wherein the surface coating comprises:

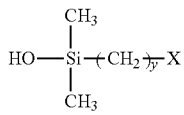

wherein:
X is OH or OCH$_2$CH$_2$OH; and
y is from 2 to 11.

3. The method of claim 2, wherein X is OH and y is 7, 10, or 11.

4. A method for passively providing anti-icing for a metal surface, comprising:
spray depositing a surface coating on the metal surface; and
heating the coated metal surface at a selected temperature for a selected time,
wherein the surface coating comprises:

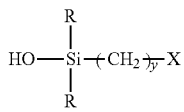

wherein:
X is OCH$_2$CH$_2$OCH$_3$; and
y is from 2 to 11, and
R is an alkyl group.

5. The method of claim 4, wherein the surface coating comprises:

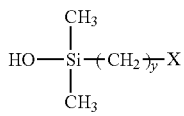

wherein:
X is OCH$_2$CH$_2$OCH$_3$; and
y is 5.

6. A method for passively providing anti-icing for a metal surface, comprising:
spray depositing a surface coating on the metal surface; and
heating the coated metal surface at a selected temperature for a selected time, wherein the surface coating comprises two different silanol compounds having the structure:

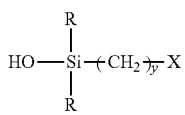

wherein:
y is from 2 to 11, and
R and X are an alkyl group.

7. The method of claim 6, wherein the surface coating comprises the two different silanol compounds, wherein the two different silanol compounds have the structure:

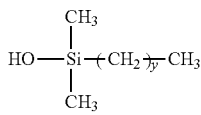

wherein y is any value from 2 to 10.

8. The method of claim 7, wherein the surface coating comprises the two different silanol compounds, wherein the two different silanol compounds comprise a first silanol compound and a second silanol compound, and wherein in the first silanol compound y is 2 and in the second silanol compound y is 6.

* * * * *